March 16, 1943.   C. R. WASEIGE   2,314,025
VARIABLE PITCH AERIAL PROPELLERS
Original Filed July 27, 1938   4 Sheets-Sheet 2
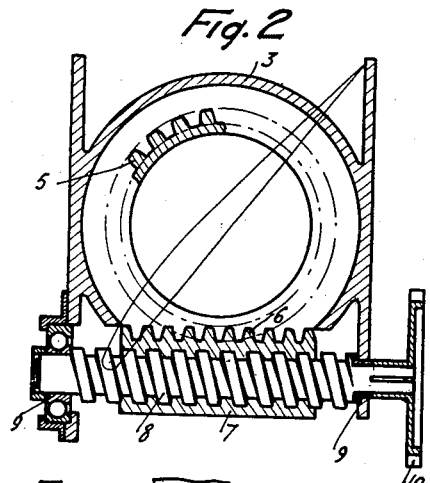
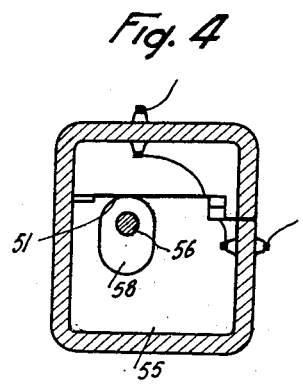
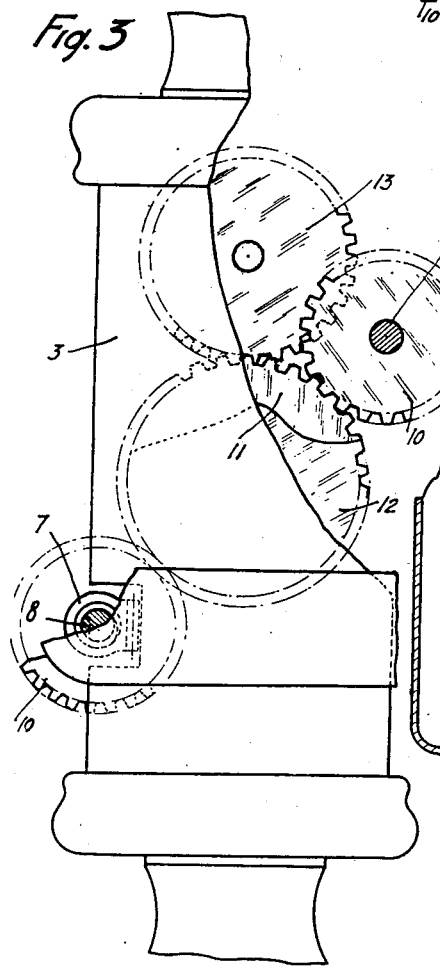
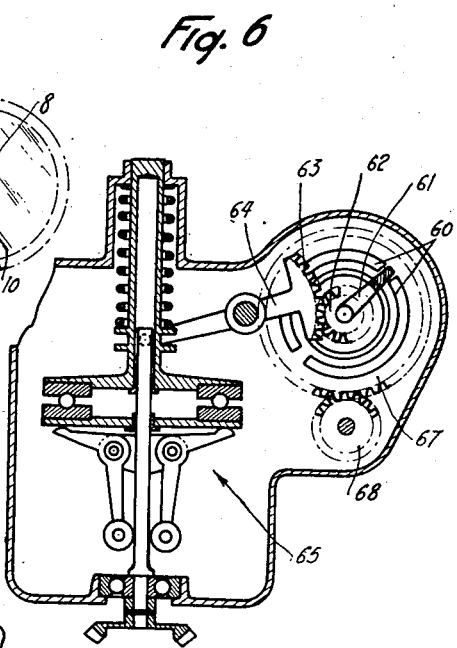
Inventor,
C. R. Waseige
By: Glascock Downing & Seebold
Attys.

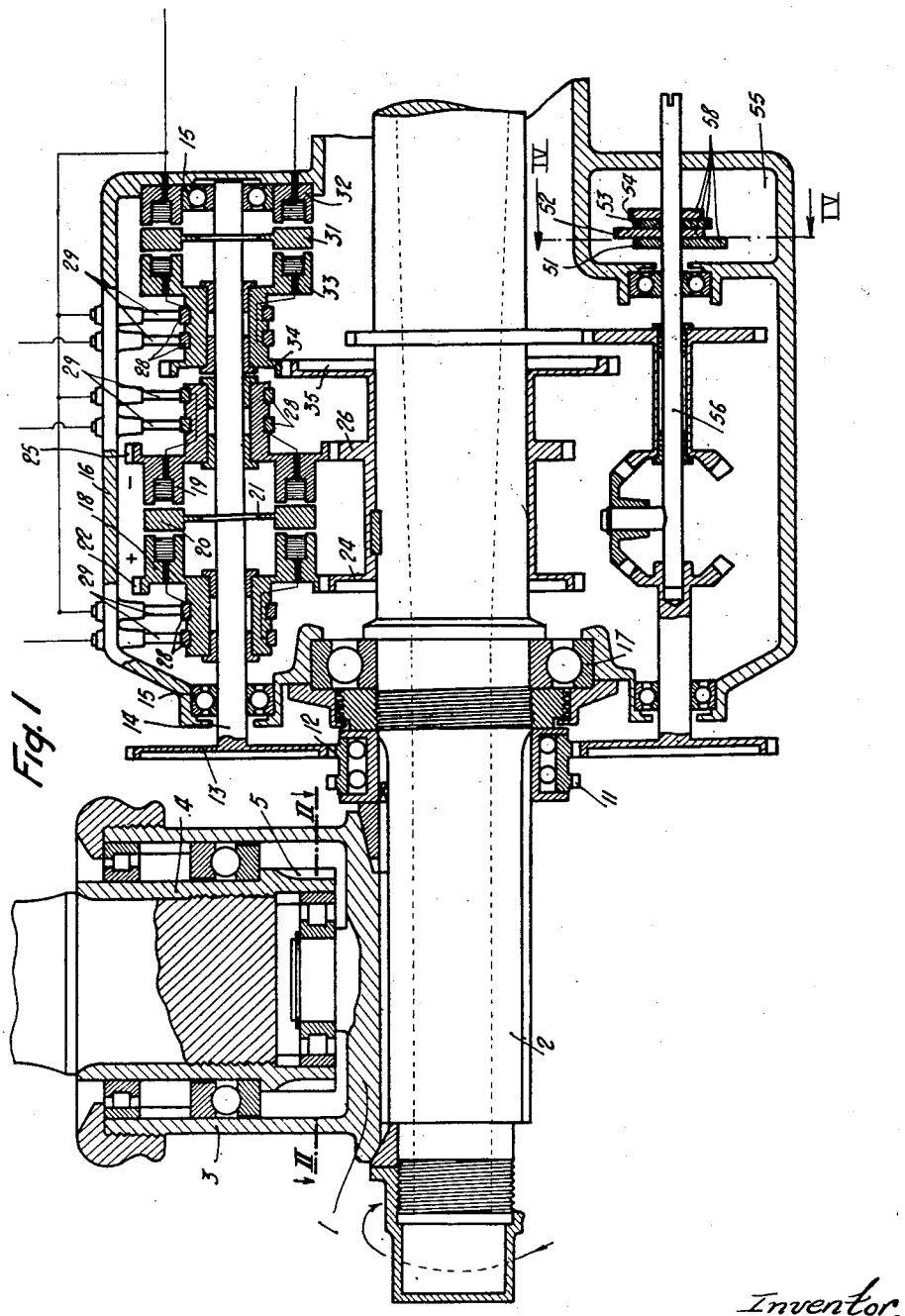

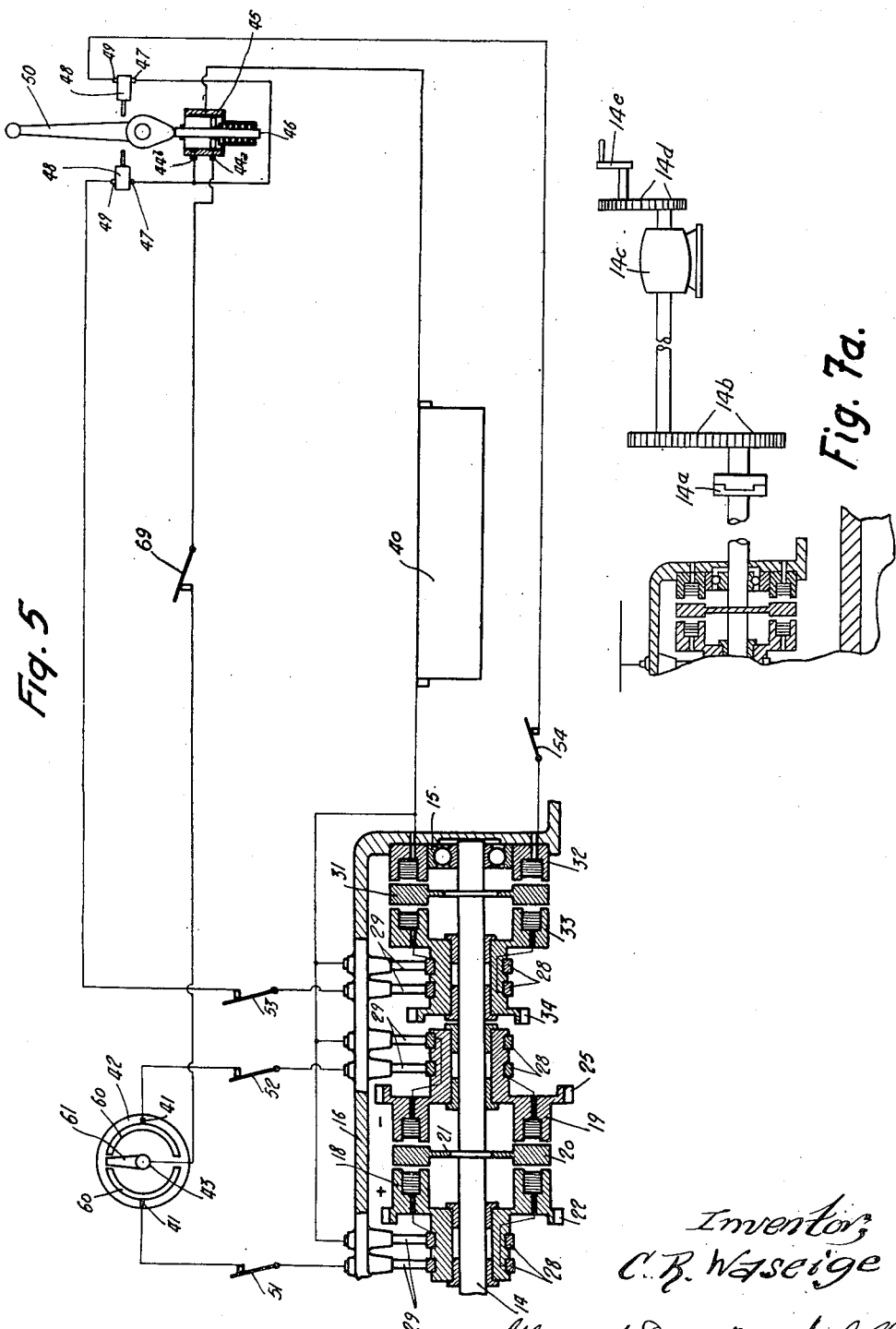

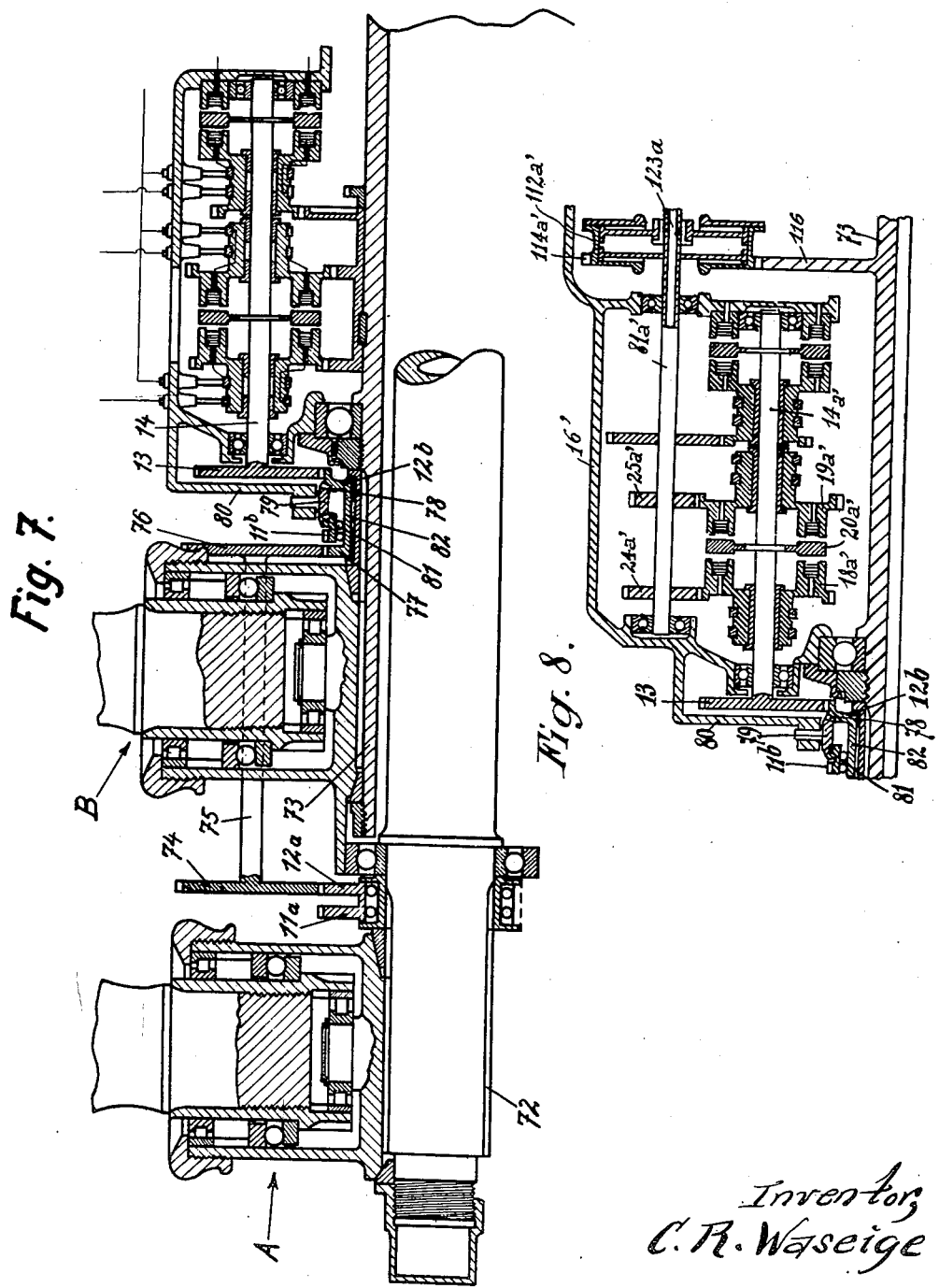

Patented Mar. 16, 1943

2,314,025

UNITED STATES PATENT OFFICE 2,314,025

VARIABLE PITCH AERIAL PROPELLER

Charles Raymond Waseige, Rueil, France; vested in the Alien Property Custodian

Original application July 27, 1938, Serial No. 221,595. Divided and this application November 28, 1939, Serial No. 306,564. In France July 30, 1937

14 Claims. (Cl. 170—163)

This application is a division of earlier application filed July 27, 1938, Serial No. 221,595 (Patent 2,236,841).

The present invention relates to variable pitch aerial propellers which can be utilized on land, sea-going or aerial vehicles. In this kind of propeller the pitch varying mechanism often comprises a gear wheel, a sleeve or other member which is arranged coaxially with respect to the propeller shaft and drives members or groups of members distributed over the hub which are equal in number to the blades of the propeller and which are respectively associated with the various blades and cause each of same to move about its own axis, said member which is coaxial with the propeller shaft being itself connected through a transmission to a source of power formed by the actual crankshaft of the engine or by an auxiliary electric or other motor.

One object of the invention is to provide a pitch varying and reversing device of small bulk, reduced weight, and reliable in operation, for aerial screw propellers including means adapted to increase and decrease the pitch at any one of two widely different rates.

Another object of the invention is to provide for the pitch variation of two tandem propellers driven by one and the same engine and rotatable relatively to one another.

By way of nonlimitative examples, a plurality of embodiments of the invention have been shown diagrammatically in the accompanying drawings, said embodiments having the above mentioned features and furthermore offering certain other peculiarities which also form detail objects of the invention.

In said drawings:

Fig. 1 is a longitudinal vertical section through the axis of the propeller shaft of an embodiment of the invention in the case of a single propeller;

Fig. 2 is a section along the line II—II of Fig. 1;

Fig. 3 is an end view of the propeller hub;

Fig. 4 is a section along the line IV—IV of Fig. 1;

Fig. 5 is a diagram of the electric controls;

Fig. 6 is a sectional view of an adjustable device for automatically controlling the pitch variation;

Fig. 7 is a similar section to that of Fig. 1 and shows the application of the invention to two coaxial propellers having their shafts invariably connected to each other and driven for example by the same engine, Fig. 7a is a fragment of the right hand end of Fig. 7 illustrating a modification of the invention, and Fig. 8 is a view similar to that of Fig. 7 and illustrates a modification of the arrangement shown in Fig. 7.

In the embodiment of Fig. 1, the propeller hub 1 which is fixed on the propeller shaft 2 has its length reduced substantially to the diameter of the cases 3 of the blade roots 4. Each blade root 4 carries at its base a spur gear 5 meshing with a rack 6 carried by an internally screw-threaded and nonrotatable sleeve 7 screw-threaded on a screw 8 having its axis parallel with the propeller shaft 2 and supported by bearings 9 belonging to the case 3; said screw abuts endwise against its two bearings and is extended outside the case 3 by a bearing surface on which is fixed a gear 10 which meshes with a gear 11 loosely mounted on the propeller shaft 2; these members 5 to 10 as a whole form a group the effect of which, when it becomes operative, is to move the corresponding blade about its own axis; the hub 1 supports a number of similar groups which are distributed near the various blades and are equal in number to that of the blades; the gear 11 meshes with the gears 10 of these various groups and consequently forms a driving member which is common to these various groups. Said gear 11 is secured to a spur gear 12 with which meshes a gear 13 fast on the end of a shaft 14 which is parallel with the shaft 2 and is journaled in bearings 15 of a support 16 having the shape of a case. Said support 16 in which is journaled the front end of the shaft 2 is fixed on the supporting case of said propeller shaft. On the shaft 14 inside the case 16 are loosely mounted the winding carrier-plates 18, 19 of two electro-magnetic clutches having the same armature 20 carried between said two plates 18, 19 by a plate 21 fast on the shaft 14 and resiliently deformable transversely. The plate 18 carries a gear 22 meshing with a gear 24 fast on the shaft 2 and the plate 19 carries a gear 23 meshing with a gear 26 likewise fast on the shaft 2. Conducting rings 28 which are fixed on the plates 18, 19 and rub against brushes 29 carried by the case 16, serve for the feed and the return of the supply current for the windings of said electro-magnetic clutches. The transmission ratio of the gear 24—22 is very slightly lower than that of the gear 12—13 which is itself very slightly lower than that of the gear 6—25.

On said shaft 14 is furthermore fixed another armature 31 which is similar to the armature 20 and cooperates with two winding-carrier plates 32 and 33, one of which, 32, is fixed to the case 16 and the other of which, 33, is loosely mounted on the shaft 14 and carries a gear 34 meshing with a gear 35 fast on the shaft 2; the supply of the winding of the plate 33 is effected by means of rings 28 and brushes 29 as for the clutches 18 and 19. The transmission ratio of the gear 33—34 is very much higher than that of the gear 24—22.

The operation is as follows:

When none of the clutches 18, 19, 32, 33 is engaged, it is obvious that the gears 10 carried by the hub of the propeller drive the gear 11 at the same speed as the propeller as though it were integral with the hub 1; the gear 12 thus rotates the shaft 14 at a speed which depends on the transmission ratio of the gear 12—13. On the other hand, the gears 24—22 and 26—25 respectively rotate the plates 18 and 19 at speeds, one of which is very slightly higher and the other very slightly lower than that of the shaft 14; the difference of speed between the two members 20 and 18, on the one hand, and 20 and 19, on the other hand, of each clutch is therefore very reduced and may be chosen by construction as small as desired. If current is passed through the winding of the plate 18, the armature 20 is attracted and the shaft 14 is compelled to rotate at the speed of the plate 18 which is slightly higher than that at which it is previously rotated; it ensues that the gears 12 and 11 are compelled to rotate slightly faster than the shaft 2 and they consequently rotate each wheel 10 about its own axis, thereby causing, by rotating the screw 8, a longitudinal movement of the nuts 7 and a variation of the pitch of the blades. By passing the current through the winding of the plate 19, the gears 11 and 12 are similarly caused to rotate slightly slower than the shaft 2, thereby causing a variation of pitch in the opposite direction to the previous one.

When current is sent through one or other of the windings of the plates 32, 33, the variation of pitch is produced in a similar manner to that just described but at a much greater speed in order to produce a very quick reversal of the pitch, in a time of less than one second.

The supply of current to the electro-magnetic clutches can be effected, in the present exemplary embodiment, according to the diagram of Fig. 5. In said diagram, each plate 18, 19, 32, 33 carries two terminals 38 and 39 for the input and output of the current in its winding. The various terminals 38 are connected in parallel to one of the poles of a battery of accumulators 40, through the medium of the rings 28 and the brushes 29 as regards the rotating plates 18, 19 and 32. The terminals 39 of the plates 18, 19 of the mechanism for the slow variation of the pitch are respectively connected to the two terminals 41 of a two way switch 42, the common terminal 43 of which is connected to a terminal 44a of another two-way switch 45, the common terminal 46 of which is connected to the other pole of the battery 40. The other terminal 44b of the switch 45 is connected in parallel to the terminals 47 of two switches 48, the two other terminals 49 of which are respectively connected to the terminals 39 of the plates 33 and 32. The same pivoting handle 50 serves to actuate the switches 45 and 48; in the position shown, the contact exists between the terminals 46 and 44a and the switch 42 is thus connected to the battery 40; on the other hand, the contact is broken between the terminals 46 and 44b; by moving the handle 50 in one direction or the other, said handle breaks the contact between the terminals 46 and 44a and makes same between the terminals 46 and 44b, thereby connecting the two switches 48 to the battery, then the handle 50 actuates the switch 48 towards which it is pushed and the current is sent into one or the other of the plates 32, 33.

Furthermore, the supply circuits of the electro-magnetic clutches each include a switch 51, 52, 53, 54, which is automatically controlled by the pitch indicator mechanism and breaks the circuit and stops the variation of the pitch or the reversal at predetermined values of the pitch. Said switches 51 to 54 are preferably grouped in the same chamber 55 (Figs. 1 and 4) through which passes the shaft 56 for actuating the pitch indicator and on which shaft are fixed four suitable cams 58. The mechanism for actuating the pitch indicator is of known type provided with a differential and will not be described herein.

The embodiment shown in the drawings furthermore includes a device for automatically actuating the switch 42 for the slow gradual variation of the pitch. For this purpose, said switch is provided with two contacts shaped like opposite segments of a circle and respectively connected to the terminals 41 on which is adapted to move a pivoting brush 61, the spindle of which carries a gear 62 meshing with a toothed quadrant 63 carried by a pivoting lever 64, which is actuated by a centrifugal device 65, such as a centrifugal governor. It is also possible to use a chronometric tachometer for this purpose. Said instantaneous revolution-counter being driven by the engine moves the lever 64 in one direction or the other as soon as the speed of the engine deviates, more or less, from a predetermined value, the brush 61 moves on to one of the segments 60 and the corresponding clutch is supplied with current until the governor has returned the brush 61 to its neutral position between the two segments 60.

It will be noted that owing to the presence of the two-way switch 45, it is impossible for the automatic variation mechanism and the reversing mechanism to operate simultaneously.

The arrangement of the centrifugal masses and of the spring is effected in such a manner that for a given difference of revolutions there is always substantially the same angular displacement of the lever 64, whatever be the speed of rotation. In this manner the range of adjustment is always the same.

The segments 60 of the switch 42 are carried by an angularly movable plate which is provided with a gear 67 engaging with a driving pinion 68 connected to a handle, not shown, within reach of the pilot and the displacement of which by the latter produces a rotation of said pinion 68 and consequently an angular displacement of the segments 60, thereby modifying the neutral position of the brush 61 and consequently the engine speed which has to be maintained by the governor.

On the part of the supply circuit which is common to the clutches 18, 19 for the automatic slow variation of the pitch, between the stud 44a of the switch 45 and the pivoting brush 61, is interposed a switch 69 which is actuated by the throttle control lever, for example through the intermediary of a cam, in such a manner as only to be closed beyond a predetermined degree of opening of said lever. Any automatic variation of the pitch is thus prevented above a predetermined speed of the engine.

In order to enable the propeller to be placed in the position of least resistance to the forward movement of the vehicle, in the event of a breakdown of the driving engine, the direction of the pitch of the screw 8 for controlling the blades will be so chosen that by stopping or slowing down the shaft 14, an increase of the pitch of the blade will be obtained. In this manner, in the event of a breakdown of the engine, it will suffice to lock the shaft 14 by any means such as a brake, a dog, etc., in order to obtain the position of least resistance assuming that the movement of the vehicle causes the propeller to rotate; if the propeller cannot rotate because the engine is seized for any other reason, a driving mechanism is added to the shaft 14. Said driving mechanism as shown in Fig. 7a, may include a clutch 14a and gears 14b fitted on the shaft 14 and adapted to be actuated by an emergency device such as an electric motor 14c or by hand through a further gear 14d and a handwheel 14e. The emergency mechanism is capable of rotating said shaft 14 in the reverse direction to that in which it normally rotates when the engine is rotating.

The embodiment illustrated in Fig. 7 relates to the case of two propellers A, B, mounted one behind the other on two concentric shafts 72, 73, rotating in opposite directions to each other at the same speed or at any speeds but which are in a constant ratio with each other; this is the case for example of two propeller shafts driven by the same engine. In the embodiment shown, each propeller A, B, is provided, for varying the pitch of the blades, with a mechanism of the type of the one previously described and illustrated in Fig. 2. For actuating the mechanism of the propeller A fast on the inner shaft 72, behind said propeller A is arranged a gear 11a loosely mounted on the shaft 72 and secured to another gear 12a; said two gears 11a and 12a perform the same function as the gears 11 and 12 of the embodiment of Fig. 1. The gear 12a meshes with a planet gear 74 keyed on a shaft 75 parallel with the propeller shaft and rotatably journaled in the hub of the propeller B; on said shaft 75 is keyed behind the propeller B another planet gear 76 meshing with a spur gear 77 loosely carried by the outer shaft 73 and secured to another gear 12b likewise loose on said shaft and driven by the gear 13 of an auxiliary shaft 14 identical with that of Fig. 1. An epicyclic transmission is thus formed having planet gears 74, 76, which are compelled to rotate in unison with each other and are loosely mounted on the propeller B fast on the outer shaft 73 and respectively meshing with sun gears 12a, 77 which are coaxial with the propellers and are arranged on either side of said propeller B, the gear 12a located between the two propellers being secured to said coaxial member 11a and the other, 77, being loosely mounted on the outer shaft 73 and driven by the pitch varying mechanism 13, 14.

The gear 12b is further provided with a bevel gear 78 in mesh with a counter-bevel pinion 79, located between the gears 12b and 77 and loosely journaled in a stationary support 80. Said bevel pinion 79 meshes with a bevel gear 81 secured to a gear 11b which is loose on the sleeve 82 connecting the gears 12b and 77 together and forming the coaxial member of the propeller B fast on the outer shaft.

As the gears 11a and 11b participate in the rotary movement of the propellers A and B and consequently rotate in opposite directions to each other, it is obvious that the gears 11b and 12b also rotate in opposite directions to each other at the same speed as the propellers; when the shaft 14 of the actuating mechanism rotates and thus accelerates or slows down the speed of the gear 12b, it is obvious that it causes a simultaneous variation in the same direction of the pitch of the two propellers.

In the case of propellers rotating at speeds which are different but are always in the same ratio, either positive or negative according to whether the propellers are rotating in the same direction or in opposite directions, the pinion 79 is replaced by a transmission having a ratio which is equal to the ratio of the speeds, or again the epicyclic transmission is constructed in such a manner that its ratio is equal to the ratio of said speeds.

In the case of propellers rotating in the same direction at the same speed, the gear 11b may be eliminated and the gear 77 in this case forms the coaxial member of the propeller B.

Referring now to the modified embodiment illustrated in Fig. 8, the essential difference between said embodiment and that of Fig. 7 is that the clutch members 18a', 19a', which are loosely mounted on the auxiliary shaft 14a', are respectively driven by wheels 24a', 25a', which are keyed on a countershaft 81a' journaled in the case 16'. Said shaft 81a' is driven in any desired manner from the engine actuating the propeller shafts, for instance, as shown, through the medium of an hydraulic clutch 112a' carried by the shaft 81a' and the driving element of which is provided with a gear 114a' in mesh with a gear 116 fast on the propeller shaft 73.

The operation is quite similar to that described above with reference to Fig. 7 but it will be noted that the use of an intermediate shaft such as 81a' may also be applied in the case of Fig. 1 and that it offers in particular the advantage of eliminating the large diameter gears 24, 25, 34 (Fig. 1) which it enables to be replaced by much smaller gears such as the gears 24a', 25a'; such an arrangement furthermore and particularly offers this advantage of enabling the movement take-off to be effected at any point and the auxiliary shaft to be arranged in any manner relatively to the driving shafts of the propellers.

In all cases, the case 16 may form, with the auxiliary shaft, with or without a counter-shaft, an autonomous assembly which may be mounted as a unit on an existing engine or in any other appropriate spot in an aircraft.

Of course, the invention is in no way limited to the constructional details illustrated and described which have only been given by way of example. Thus, in particular, without exceeding the scope of the invention, it is possible to substitute mechanically, pneumatically or hydraulically actuated clutches of another type for the electromagnetic clutches; similarly, the propeller need not have any reversing mechanism, the mechanism carried by the hub for driving each blade may be different from the one described, the movement take-off for driving the shafts 81a', 81b' may be effected at any point of the engine or of the transmission between the engine and the propeller.

What I claim is:

1. A pitch varying and reversing device for aerial screw propellers including means adapted to increase and decrease the pitch at any one of two widely different rates, wherein said means includes a gear coaxial to the propeller and rotatable relatively thereto, gear means adapted to operatively connect said coaxial gear to the propeller blades so that a rotation of said coaxial gear relative to the propeller will produce a variation of the pitch, motion transmitting means whereby said coaxial gear may be rotated relative to the propeller, said motion transmitting means including at least three gear trains adapted each to rotate said gear coaxial to the propeller and first, second, third and fourth clutches including driving and driven coupling parts, countershaft means supporting the driving and driven parts of said three first clutches and stationary bearing means for said countershaft means, the driven parts of said three clutches being in permanent driving connection with said coaxial gear and the three clutches arranged to selectively set said gear trains into and out of operative connection with said coaxial gear, the gear ratios of said three gear trains being, the one slightly greater, the other slightly less and the third far higher than the gear ratio between said coaxial gear and the driven part of the associated clutch, means including said fourth clutch or coupling, one coupling part of which being in permanent connection with said coaxial gear, said last named means being adapted to alter rotation of said latter coupling part of the fourth clutch, and thereby of said coaxial gear, in a way contrary to that resulting from the operation of said third clutch and gear train, and control means for said four clutches.

2. A pitch varying and reversing device for aerial screw propellers, including means adapted to increase and decrease the pitch at any one of two widely different rates, wherein said means includes a rotatable countershaft, stationary bearing means supporting said countershaft, a gear fast on said countershaft, a gear coaxial to the propeller and rotatable relatively thereto and in mesh with said gear carried by the countershaft, gear means adapted to operatively connect said gear coaxial to the propeller to the propeller blades so that a rotation of said coaxial gear relatively to the propeller will produce a variation of the pitch, first, second, third clutches carried by said countershaft, each of which having its driven part fast on the countershaft, power means, and at least three gear trains rotatably and respectively connecting the driving part of the first, second and third clutches to the power means, the gear ratio of said three gear trains being, the one for the first clutch slightly greater, the other for the second clutch slightly less and the third for the third clutch far higher than the gear ratio between said gear coaxial to the propeller and said countershaft, means including a fourth clutch or coupling including two cooperating coupling parts, one of which being secured on said countershaft, said last named means being adapted to alter rotation of said latter coupling part of the fourth clutch, and thereby of said coaxial gear, in a way contrary to that resulting from the operation of said third clutch and gear train, and control means for said four clutches.

3. A pitch varying and reversing device as in claim 1 wherein said four clutches are electromagnetic clutches and the control means therefor includes an electric source, a two way switch, two separate wire means from two separate terminals of said switch to the two first named electromagnetic clutches, wire means from said clutches to one and the same pole of said source, a control two-way switch, a wire from the common contact stud of said first named two-way switch to one of the contact studs of said control switch, the contact stud of the latter that is common to both ways being connected to the other pole of said source, wire means from the other separate stud of said control switch to said two other electromagnetic clutches, respectively, a switch in each of said wire means, wire means from said two last named clutches to the first named pole of the source, and manually operable control means for simultaneous control of said control switch and each of said last named switches.

4. In a pitch varying mechanism for propelling means including two aerial propellers with variable pitch, coaxially arranged one behind the other, each of which includes a hub and propeller blades rotatably carried by said hub, and two concentric inner and outer propeller shafts respectively carrying said propellers, a transmission member associated with the propeller carried by the inner shaft and arranged between said two propellers and coaxially thereto, a plurality of motion transmitting contrivances carried by the hub of the propeller fast on the inner shaft and respectively connecting said transmission member to the various blades of this propeller and adapted to transform a motion of the transmission member relatively to the propeller shaft into a pitch varying motion of the blades, an epicyclic transmission including sun gears and planet gears said planet gears being carried by the propeller fast on the outer shaft and compelled to rotate in unison with each other and said sun gears being arranged on either side of and coaxially to said propeller, carried by the outer shaft, the sun gear located between the two propellers being so connected to said transmission member that an angular motion of said sun gear relatively to the inner shaft will cause a motion of said transmission member relatively to the same shaft, driving means adapted to cause an angular motion of the other sun gear, and control means for said driving means.

5. In a pitch varying mechanism as in claim 4, common power means for rotating both said propeller shafts, a motion transmitting means arranged on the same side of the propeller on the outer shaft as the sun gear around said shaft, coaxially therewith, and movable relatively to said shaft, said motion transmitting means being connected to said driving means to be actuatable thereby and a plurality of motion transmitting contrivances carried by the propeller fast on the outer shaft and respectively connecting said motion transmitting means to the various blades to transform a motion of said means relatively to the outer shaft into a pitch varying motion of the blades.

6. In a pitch varying mechanism as in claim 4, separate power means for rotating separately said propeller shafts, a motion transmitting means arranged on the same side of the propeller on the outer shaft as the sun wheel around said shaft, coaxially therewith, and movable relatively to said shaft, said motion transmitting means being connected to the various blades to transform a motion of said means relatively to the outer shaft into a pitch varying motion of the blades and separate actuating mechanism for independently moving said transmission member and motion transmitting means relatively to the associated shaft.

7. A pitch varying and reversing device as in claim 1 wherein said gear wheel trains include at least one auxiliary countershaft and stationary bearing means rotatably supporting the latter.

8. A pitch varying device as in claim 1 wherein said stationary bearing means consists in a separate casing forming with the motion transmitting means carried thereby a self-contained and separately removable unit.

9. A pitch varying and reversing device for aerial screw propellers including means adapted to increase and decrease the pitch at any one of two widely different rates, wherein said means includes a gear coaxial to the propeller and rotatable relatively thereto, gear means adapted to operatively connect said coaxial gear to the propeller blades so that a rotation of said coaxial gear relative to the propeller will produce a variation of the pitch, motion transmitting means whereby said coaxial gear may be rotated relative to the propeller, said motion transmitting means including at least three gear trains adapted each to rotate said gear coaxial to the propeller and three stationary supported clutches including driving and driven parts, said driven parts being in permanent driving connection with said coaxial gear and the clutches being respectively associated to said gear trains to selectively set them into and out of operative connection with said coaxial gear, the gear ratios of said three gear trains being, the one slightly greater, the other slightly less and the third far higher than the gear ratio between said coaxial gear and the driven part of the associated clutch, means including a fourth clutch or coupling including two cooperating coupling parts, one of which being in permanent driving connection with said coaxial gear, said last named means being adapted to alter rotation of that connected part of said fourth clutch and thereby of the coaxial gear in a way contrary to that of said third gear train, and control means for said four clutches.

10. A pitch varying and reversing device for aerial screw propellers as in claim 9, further including propeller driving means in permanent driving connection with the driving parts of said three clutches, 11. A pitch varying and reversing device for aerial screw propellers as in claim 9, further including at least one auxiliary countershaft forming part of said gear wheel trains and in permanent driving connection with at least some of the driving parts of said three clutches, and a propeller driving shaft connected to said auxiliary countershaft to be able to rotate the latter.

12. A pitch varying and reversing device for aerial screw propellers as in claim 9, further including propeller driving means in permanent driving connection with the driving parts of said three clutches, and emergency motion transmitting means separately actuatable, i. e. otherwise than from said propeller driving means, and connected to said driving parts to be adapted to rotate the latter, so that the pitch can be varied even when said propeller driving means are not in operation.

13. A pitch varying and reversing device as claimed in claim 2, further provided with emergency motion transmitting means separately actuatable otherwise than from said power means and connected to said countershaft, the latter being thus enabled to be rotated thereby so that the pitch can be varied even when said power means are not in operation.

14. A pitch varying and reversing device as claimed in claim 2, further provided with emergency power means connected to said countershaft to rotate the latter and thereby vary the pitch when said propeller actuating power means is not in operation.

CHARLES RAYMOND WASEIGE.